June 22, 1937.  W. C. HYDE  2,084,808
SOUND AND PICTURE REPRODUCING APPARATUS FOR ADVERTISING PURPOSES
Filed Feb. 8, 1937  2 Sheets-Sheet 1
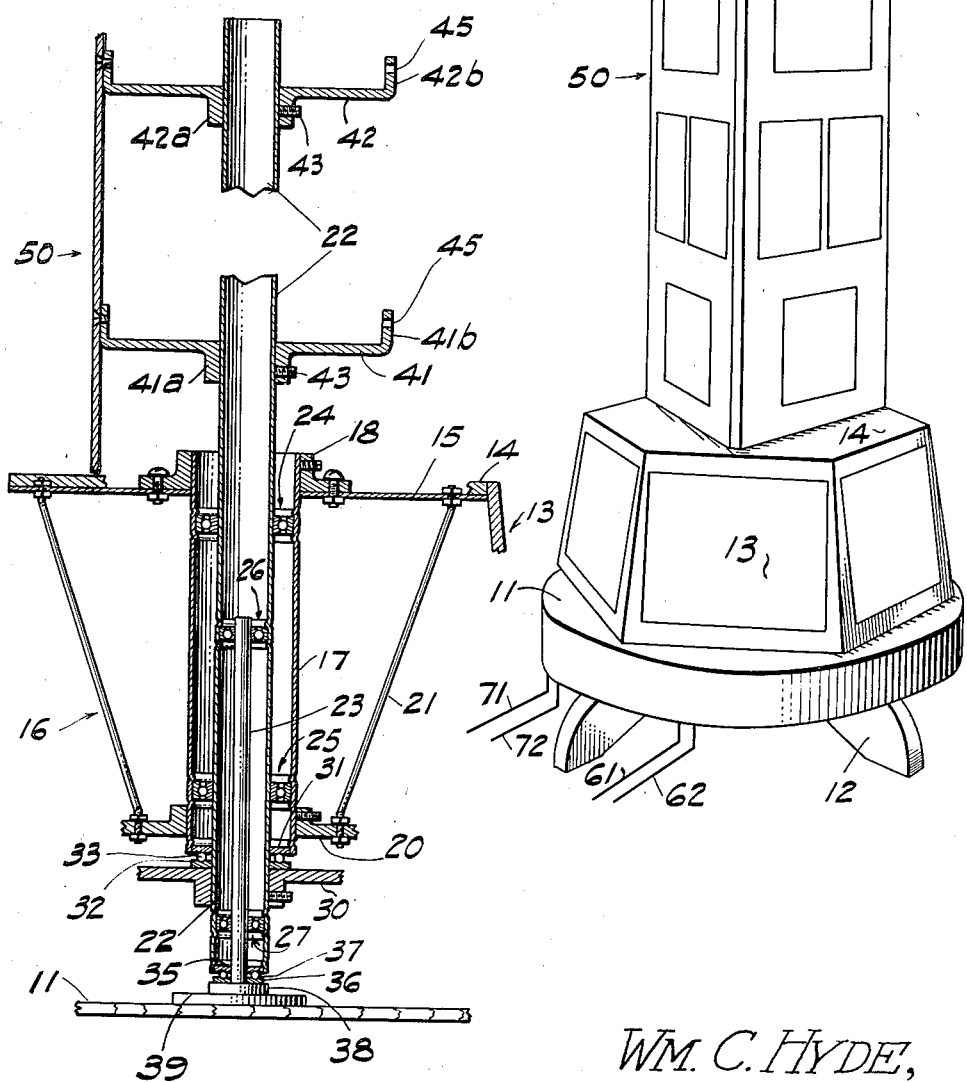
WM. C. HYDE,
INVENTOR.
BY
ATTORNEY.

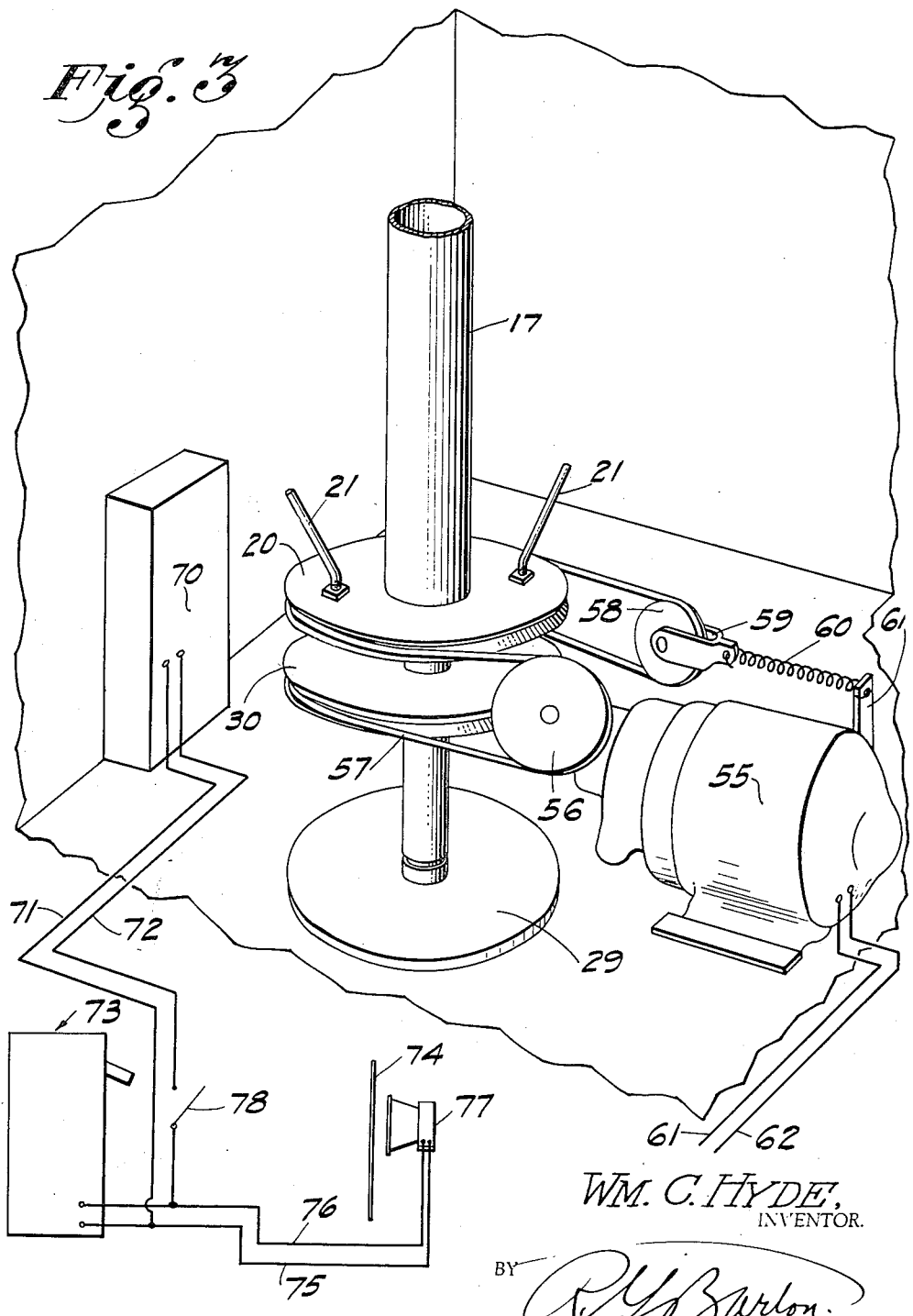

Patented June 22, 1937

2,084,808

UNITED STATES PATENT OFFICE 2,084,808

SOUND AND PICTURE REPRODUCING APPARATUS FOR ADVERTISING PURPOSES

William C. Hyde, Hollywood, Calif., assignor to Royal Revues, Inc., Hollywood, Calif.

Application February 8, 1937, Serial No. 124,613

3 Claims. (Cl. 40—33)

This invention relates to a sound and picture reproducing apparatus for advertising purposes. The present invention primarily is intended for remote use in connection with theatre advertising consisting of one portion of the machine rotating in one direction carrying advertising pertaining to "coming events" and events "now playing" and another portion rotating in another direction which may be made to include the advertising and names of the sponsors doing the "time being" merchant advertising on the reel which is being shown within the theatre.

The present invention also contemplates a combination of visible and audible theatrical and advertising features wherein, with a moving picture apparatus having synchronized loud speakers receiving their sound impulses from the sound track on the film, is combined, at the entrance of the theatre, a series of mechanically advanced "still" pictures, representative of the moving pictures being displayed in the theatre, there being located, within the hearing of persons observing said representative pictures, a sound reproducer which simultaneously reproduces from the sound track of aforesaid film, the sound which is accompanying the moving picture being displayed within the theatre. When there is a theatrical presentation of advertising matter, said representative pictures will set forth portions of the advertising being presented within the theatre and will also in the proper sequence make references to the personnel and firm names of the parties sponsoring such advertising.

In view of the fact the showing of "coming events" and theatre advertising alternate with the principal picture program, pictures relating to motion picture stars and the production in which they are cast can be displayed on one panel of the machine, those cast in events "now showing" in another panel and another polygonal rotating portion of the machine may be devoted entirely to the sponsors doing the "time being" advertising.

It is therefore one of the principal objects of the invention to provide in apparatus of the above character means whereby any one passing a theatre may be informed of "coming events" and "events playing" and listen to audible matter relating to them simultaneously at the time an audience is listening to and viewing corresponding matter within the theatre.

Another object of the invention is to provide a display machine having a novel means of rotating and providing novel mechanism for rotating the same.

Other objects, advantages and features of invention will hereinafter appear.

Referring to the accompanying drawings, which illustrate what is at present deemed to be a preferred embodiment of the invention, Fig. 1 is a perspective view of the complete device.

Fig. 2 is a vertical mid-section of the internal portion thereof, parts being broken away in order to contract the view.

Fig. 3 is a fragmentary perspective view of the internal lower portion of the device showing the means whereby the same is operated by a motor. This view includes a diagrammatical showing of the sound reproducer and of the electrical connections for the complete apparatus.

Referring in detail to the drawings, the structure viewed externally is seen to comprise a circular, stationary base 11, supported by legs 12, upon and above which are rotatably mounted a series of picture panels 13, the upper portions of said panels being attached in any suitable manner to a polygonal platform 14. This platform, in turn, is fastened to an underlying, rotatable plate 15, the contour of which is shaped to correspond to that of said platform.

Said platform forms part of a rotatable frame 16 (see Fig. 2) comprising an outer tube or sleeve 17 which has externally attached to its upper end a collar 18 to the lower side of which is secured aforesaid plate 15, said plate having a central opening to receive said sleeve. Near the lower end of said sleeve is secured thereto a peripherally grooved collar or disk 20. A plurality of stay rods 21 unite the parts 15 and 20 to complete the frame 16.

Said frame 16 is mounted upon an upstanding tubular shaft 22 which, in turn, is supported for a reverse rotation upon a stationary stub shaft 23 which upstands from the base 11. Ball bearings 24 and 25 are interposed between the tubes 17 and 22 and ball bearings 26 and 27 between sleeve 22 and said shaft 23. The sleeve 22 is rotated by means of a grooved disk or pulley 30 secured thereto. Within the lower end of sleeve 17 is secured a thrust ring 31 which fits loosely around the tube 22. With this thrust ring cooperates a like ring 32 which also fits loosely around the tube 22, bearing balls 33 being interposed between these rings to complete the thrust bearing. The base end of tube 22 is likewise furnished with a thrust bearing ring 35, cooperative bearing ring 36 and bearing balls 37. This latter bearing structure, together with shaft 23, is supported by the base structure afforded by the upper base disk 38 and lower disk 39, these two disks being secured in any suitable manner to the central portion of the circular base 11.

Above the rotatable frame 16 are attached to the tubular shaft the lower polygonal bracket 41 and upper bracket 42, these members respectively having hub portions 41a and 42a furnished with set screws 43. Said brackets, by preference and as shown, are formed as polygonal plates having upstanding, peripheral flanges 41b and 42b furnished with screw holes 45.

The two brackets which have just been described are of the proper size and shape to fit within the upper picture panel casing 50 of Fig. 1, and this casing is secured to said brackets, being by them rotatably supported with its lower end just clear of the platform 14 which rotates reversely to the casing 50.

To provide the reverse rotation which has been mentioned, the driving means shown, by way of example, in Fig. 3 is provided. Said driving means comprises, in addition to the pulleys 20 and 30, the reduction motor 55 having a driving pulley 56 over which passes a belt 57, said pulley 56 being positioned to bring the upper run of said belt into engagement with the pulley 20 while its lower run is brought into engagement with the pulley 30. The end portion of belt 57 which is opposite to the driving pulley 56 is looped around an idle tension pulley 58 mounted upon a bifurcated block 59 attached by a tension spiral spring 60 to a post 61. 62 and 63 designate the leads which supply current to the motor. Said motor is supported by the base 11 and is concealed by the picture panels 13.

It will be seen that, by the driving means which have been described, the motor will rotate the lower picture carrying frame 16 in one direction while the upper picture panel support 50 is rotated in the reverse direction. A unitary means is thus provided for simultaneously moving both sets of pictures, even tho they are rotated in reverse directions.

In Fig. 3 is indicated an electrical loud speaker 70 which, together with the motor 55 is supported by the base 11 and is housed in by the picture panels 13. Said loud speaker is furnished with conductors 71, 72 which are supplied with current which conveys the sound from the sound track of a motion picture film within the sound and picture reproducing apparatus 73 located within the theatre to project pictures upon the screen 74, with their sound accompaniments. The sound from the reproducer 73 is thus synchronized with the motor 55 to give a description appropriate to the particular pictures being presented to the observer, it being understood that the pictures displayed by the display means 13 and 50 of Fig. 1 are representative of those being displayed by a moving picture being displayed, or at least that certain of the actors of said picture are displayed by them.

The main wires 75 and 76 connect the sound track within the apparatus 73 with a loud speaker or speakers 77 which are stationed rearwardly of the acoustic screen 74 within the theatre. Wires 75 and 76 are respectively connected with aforementioned conductors 71 and 72 of the loud speaker 70. The conductor 72 is furnished with a switch 78 in order to switch in at desired intervals the sound from the sound track descriptive of the screen picture of which the pictures shown in Fig. 1 are representative.

In the operation of the device, the same having been installed in the lobby or foyer of the theatre where it will be observed by prospective patrons passing by, whenever it is desired to display to such persons sample portions of plays being shown or to be later offered to the public, the attendant will close the motor switch not shown thereby starting the motor 55 and causing the picture panel structures 13 and 50 (see Fig. 1) to begin to rotate in opposite directions. If it is desired to have sound accompany the motor-operated device he will also close switch 78 to cause the loud speaker 70 to produce simultaneously the same sounds as are at that particular time being heard within the theatre. With the proper pictures mounted upon said panel structures the device may thus be operated from time to time in such a manner as to present to the eyes and ears of persons passing the theatre the same play-advertising features as are being presented to persons within the theatre. Also in addition to this the business advertising and names of the sponsors thereof may be called to the attention of persons outside the theatre as well as to those therewithin.

Altho it will not require but a few minutes for the motor to perform a complete rotation of the pictures mounted upon the panels, yet it is to be understood that they can readily be removed after exhibiting and replaced with new ones to advertise other plays and business.

It should be understood that the present disclosure is for the purpose of illustration only and that this invention includes all modifications and equivalents which fall within the scope of the subject matter claimed.

What is claimed is:

1. In an apparatus of the kind described, stationary upstanding supporting means, an upper rotatable picture support mounted thereon, a lower rotatable picture support mounted thereon, each of said upper and lower supports being telescopically arranged in spaced rotation and having secured to it a driven pulley which rotates in a substantially horizontal plane, ball bearings supporting and maintaining the spaced arrangements of said upper and lower supports, a belt having an upper run engaging said upper pulley and a lower run engaging said lower pulley, a driving pulley around which one end portion of said belt passes, an idle pulley around which the opposite end portion of said belt is passed, mounting means for said idle pulley, said mounting means comprising a freely suspended bifurcated block, yieldable traction means to maintain said belt taut, and a support to which said traction means is fastened.

2. In an apparatus of the character described, a base, a stationary upstanding shaft mounted thereon, an inner tubular shaft ball-bearingly mounted upon said base and upstanding shaft to rotate thereabout, an outer tubular shaft, means to ball-bearingly support said outer tubular shaft in a spaced position to rotate around said inner tubular shaft, said inner tubular shaft having an upwardly projecting portion above said outer tubular shaft, picture supporting means mounted upon said outer tubular shaft to rotate therewith, picture supporting means mounted upon the portion of said inner tubular shaft that projects above said outer tubular shaft, each of said shafts having a pulley concentrically secured thereto, said outer shaft being ball-bearingly supported by the pulley which is secured to said inner shaft, a belt having two runs one of which operatively engages one of said pulleys to rotate one of said tubular shafts in one direction while the other run operatively engages the other of said pulleys to rotate the other tubular shaft in the opposite direction, and means to drive said belt.

3. In an apparatus of the kind described, a base, an upstanding shaft mounted thereon, an inner tubular shaft mounted upon said upstanding shaft to rotate thereabout, an outer tubular shaft mounted upon said inner shaft to rotate thereabout, a portion of said inner shaft projecting above the upper end of said outer shaft and another portion thereof projecting downwardly therebelow, each of said tubular shafts having picture supports mounted upon them, a driven pulley concentrically secured to said downwardly projecting portion of said inner shaft, a driven pulley concentrically secured to said outer tubular shaft in an upwardly spaced relation to the first recited pulley, means to ball-bearingly support said outer tubular shaft on the first recited driven pulley, a driving pulley having a diameter equal approximately to the distance between said driven pulleys, a belt passing over said driving pulley and having an upper run passing around one of said driven pulleys and a lower run passing around the other of said driven pulleys, an idle pulley over which is looped the end portion of said belt which is opposite to said driving pulley, and means to support said idle pulley.

WM. C. HYDE.